(12) United States Patent
Niwa et al.

(10) Patent No.: US 10,458,537 B2
(45) Date of Patent: Oct. 29, 2019

(54) SHIFT DEVICE

(71) Applicant: KABUSHIKI KAISHA TOKAI-RIKA-DENKI-SEISAKUSHO, Aichi-ken (JP)

(72) Inventors: Takehiro Niwa, Aichi-ken (JP); Yohei Nakano, Aichi-ken (JP); Naomi Asahina, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 23 days.

(21) Appl. No.: 15/657,783

(22) Filed: Jul. 24, 2017

(65) Prior Publication Data

US 2018/0031118 A1 Feb. 1, 2018

(30) Foreign Application Priority Data

Jul. 28, 2016 (JP) .................................. 2016-148381

(51) Int. Cl.
*F16H 59/10* (2006.01)
*F16H 61/24* (2006.01)
(Continued)

(52) U.S. Cl.
CPC ......... *F16H 59/105* (2013.01); *F16H 59/044* (2013.01); *F16H 61/24* (2013.01);
(Continued)

(58) Field of Classification Search
CPC ...... F16H 59/105; F16H 59/044; F16H 61/24; F16H 2059/026; F16H 2059/0269; F16H 2061/242
(Continued)

(56) References Cited

U.S. PATENT DOCUMENTS 6,530,293 B1 * 3/2003 Ruckert ................ F16H 59/105
324/207.23
7,086,306 B2 * 8/2006 Syamoto ............. F16H 59/0204
74/471 XY
(Continued)

FOREIGN PATENT DOCUMENTS

DE          10319720 B3 *  9/2004 ......... F16H 59/0204
DE     102006028228 A1 * 12/2006 ........... F16H 59/044
(Continued)

OTHER PUBLICATIONS

Office Action issued in the corresponding Japanese application No. 2016-148381 dated Apr. 24, 2018.
(Continued)

*Primary Examiner* — Jake Cook
*Assistant Examiner* — Gregory Robert Weber
(74) *Attorney, Agent, or Firm* — Roberts Mlotkowski Safran Cole & Calderon, P.C.

(57) ABSTRACT

In a shift lever device, a lever moves an operation member when the lever is rotationally operated in a front-rear direction, and the lever rotates a select link such that the select link moves the operation member when the lever is rotation operated in a left-right direction. The position of the operation member is detected to detect a shift position of the lever. When the lever is rotation operated in the front-rear direction, the lever therefore moves the operation member without being through the select link, thereby enabling the precision with which the shift position of the lever in the front-rear direction is detected to be raised.

12 Claims, 7 Drawing Sheets

(51) Int. Cl.
*F16H 59/04* (2006.01)
*F16H 59/02* (2006.01)

(52) U.S. Cl.
CPC .............. *F16H 2059/026* (2013.01); *F16H 2059/0269* (2013.01); *F16H 2061/242* (2013.01)

(58) Field of Classification Search
USPC ...................................................... 74/473.12
See application file for complete search history.

(56) References Cited

U.S. PATENT DOCUMENTS

| | | | | |
|---|---|---|---|---|
| 7,219,572 | B2 * | 5/2007 | Syamoto | F16H 59/0204 74/335 |
| 7,621,198 | B2 * | 11/2009 | Kako | F16H 59/0278 116/28.1 |
| 7,650,811 | B2 * | 1/2010 | Matsui | F16H 59/105 74/473.12 |
| 8,333,128 | B2 * | 12/2012 | Schober | F16H 59/105 74/473.12 |
| 8,752,448 | B2 * | 6/2014 | Giefer | F16H 59/0217 74/473.12 |
| 2004/0035237 | A1 † | 2/2004 | Matsui | |
| 2010/0175494 | A1 * | 7/2010 | Schober | F16H 59/105 74/473.12 |
| 2014/0145712 | A1 | 5/2014 | Nakamura et al. | |
| 2015/0068343 | A1 * | 3/2015 | Tokumo | F16H 61/0213 74/473.12 |
| 2016/0201795 | A1 * | 7/2016 | Kvarnstrom | F16H 59/0204 74/473.18 |
| 2017/0191561 | A1 * | 7/2017 | Seibold | F16H 59/08 |

FOREIGN PATENT DOCUMENTS

| | | | |
|---|---|---|---|
| DE | 102006028228 A1 | 12/2006 | |
| DE | 102006021078 B3 * | 8/2007 | ........... F16H 59/105 |
| EP | 0075693 A1 | 4/1983 | |
| EP | 1589322 A1 | 10/2005 | |
| JP | 2003-327002 A | 11/2003 | |
| JP | 2004138235 A | 5/2004 | |
| JP | 2007062664 A | 3/2007 | |
| JP | 2010533093 A | 10/2010 | |
| JP | 2015-58923 A | 3/2015 | |
| JP | 2015-93656 A | 5/2015 | |
| WO | WO-2015139740 A1 * | 9/2015 | ........ F16H 59/0204 |

OTHER PUBLICATIONS

Extended European Search Report issued in the corresponding application No. EP 17183198.5 dated Jan. 10, 2018.

\* cited by examiner
† cited by third party

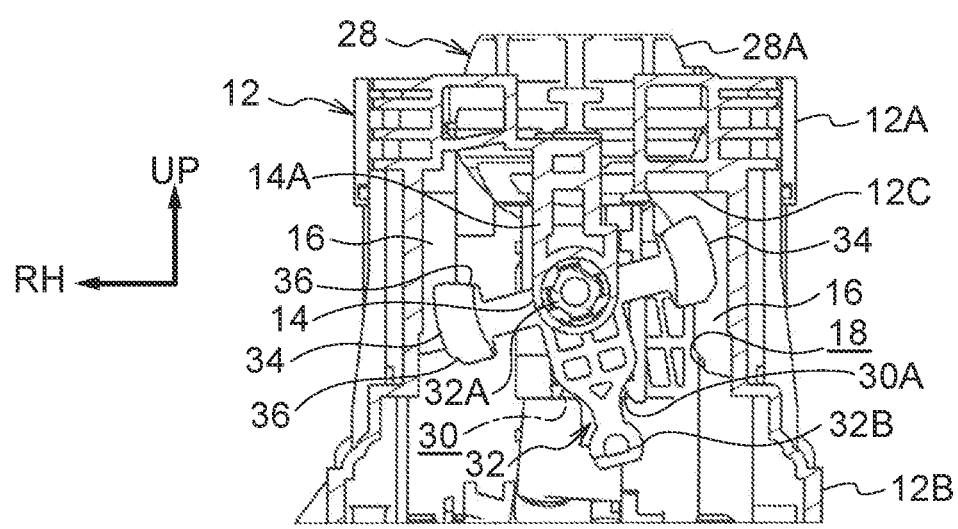

SHIFT DEVICE

CROSS-REFERENCE TO RELATED APPLICATION

This application claims priority under 35 USC 119 from Japanese Patent Application No. 2016-148381 filed Jul. 28, 2016, the disclosure of which is incorporated by reference herein.

BACKGROUND

Field of the Invention

The present invention relates to a shift device in which a shift position of a shift body is changed by moving the shift body in a first direction and a second direction.

Related Art

In a shift lever device described in Japanese Patent Application Laid-Open (JP-A) No. 2015-93656, a shift lever and a retainer rotate a link when the shift lever is rotated in a front-rear direction, and the shift lever is rotated with respect to the retainer to rotate the link when the shift lever is rotated in a left-right direction. Moreover, a detection mechanism is disposed at a lower side of the shift lever, and the detection mechanism detects a shift position of the shift lever by the link rotating so as to actuate the detection mechanism.

Note that in this shift lever device, the shift lever actuates the detection mechanism through the link when the shift lever is rotated in the front-rear direction.

SUMMARY

In consideration of the above circumstances, a shift device is obtained that is capable of raising the precision with which a shift position of a shift body is detected in a first direction.

A shift device of a first aspect includes: a shift body having one end side that is movably operable in a first direction and in a second direction so as to change a shift position; a moving body that is movable by the shift body being moved in the second direction; and a detection section that is disposed at another end side of the shift body, that is actuated by the shift body when the shift body is moved in the first direction such that the shift position of the shift body is detected, and that is actuated by the moving body when the shift body is moved in the second direction such that the shift position of the shift body is detected.

A shift device of a second aspect is the shift device of the first aspect, wherein a movement amount of the moving body is amplified with respect to a movement amount of the shift body in the second direction.

A shift device of a third aspect is the shift device of either the first aspect or the second aspect, further including: a moving portion that is provided at the moving body, the moving body being moved by the moving portion being moved; and a rotation portion that is provided at the shift body and that is communicated with the moving portion, wherein: the rotation portion is rotated toward a side away from the moving portion while tilting toward a side approaching the moving portion when the shift body is moved toward one side in the first direction, and the rotating portion is rotated toward the side approaching the moving portion while tilting toward the side away from the moving portion when the shift body is moved toward another side in the first direction.

A shift device of a fourth aspect is the shift device of any one of the first aspect to the third aspect, further including a guide portion that guides movement of the moving body.

A shift device of a fifth aspect is the shift device of the fourth aspect, wherein the moving body is mountable to the guide portion at a movement position of the moving body, which movement position is outside of a movable range of the moving body by the shift body.

A shift device of a sixth aspect is the shift device of any one of the first aspect to the fifth aspect, further including a stopping portion by which the moving body is stopped at a stop position such that the shift body is able to communicate with the moving body from a state in which the moving body is stopped at the stop position.

In the shift device of any one of the above aspects, the shift body is provided with a first communicating portion, and the moving body is provided with a second communicating portion; the first communicating portion and the second communicating portion are communicated with an operation member provided at the detection section; when the shift body is moved in the first direction, the first communicating portion moves the operation member, the shift position of the shift body in the first direction is detected by the detecting section detecting position of the operation member; and when the shift body is moved in the second direction, the second communicating portion moves the operation member, the shift position of the shift body in the second direction is detected by the detecting section detecting position of the operation member.

In the shift device of the first aspect, the shift body is move operated in the first direction and the second direction at the one end side of the shift body to change the shift position of the shift body. Moreover, the moving body is moved by the shift body being moved in the second direction. Further, the detection section is disposed at the another end side of the shift body. The shift body actuates the detection section when the shift body is moved in the first direction such that a shift position of the shift body is detected, and the moving body actuates the detection section when the shift body is moved in the second direction such that a shift position of the shift body is detected.

Note that as described above, when the shift body is moved in the first direction, the shift body actuates the detection section. The shift body therefore actuates the detection section without being through the moving body, thereby enabling the precision with which the shift position of the shift body in the first direction is detected to be raised.

In the shift device of the second aspect, the movement amount of the moving body is amplified with respect to the movement amount of the shift body in the second direction. Accordingly, an actuation amount of the detection section by the moving body when the shift body is moved in the second direction can be made large, thereby enabling the precision with which the shift position of the shift body in the second direction is detected to be raised.

In the shift device of the third aspect, the moving portion of the moving body is moved such that the moving body is moved.

The rotation portion of the shift body is communicated with (connected to) the moving portion, and the rotation portion is rotated toward the side away from the moving portion while tilting toward the side approaching the moving portion when the shift body is moved toward the one side in the first direction. The rotation portion is rotated toward the side approaching the moving portion while tilting toward the side away from the moving portion when the shift body is moved toward the another side in the first direction. This thereby enables that the rotation portion moving the moving portion and thereby moving the moving body is suppressed, when the shift body is moved in the first direction.

In the shift device of the fourth aspect, the guide portion guides movement of the moving body. This thereby enables the precision of a movement position of the moving body due to movement of the shift body to be raised.

In the shift device of the fifth aspect, the moving body is mountable to the guide portion at a movement position outside of a movement range of the moving body moved by the shift body. This thereby enables the moving body to be mounted to the guide portion.

In the shift device of the sixth aspect, the stopping portion enables the shift body to communicate with (connect to) the moving body from a state in which the moving body is stopped at the stop position. This thereby enables the shift body to be communicated with the moving body easily.

BRIEF DESCRIPTION OF THE DRAWINGS

Exemplary embodiments will be described in detail with reference to the following figures, wherein:

FIGS. 6A to 6C are cross-sections (cross-sections sectioned along line 6-6 in FIG. 3) illustrating elements including a select link of a shift lever device according to an exemplary embodiment as viewed from the front, in which FIG. 6A illustrates assembly of the select link to a plate, FIG. 6B illustrates connection of the select link to a lever, and FIG. 6C illustrates a connected state of the select link to the lever.

DETAILED DESCRIPTION

Figure 1:
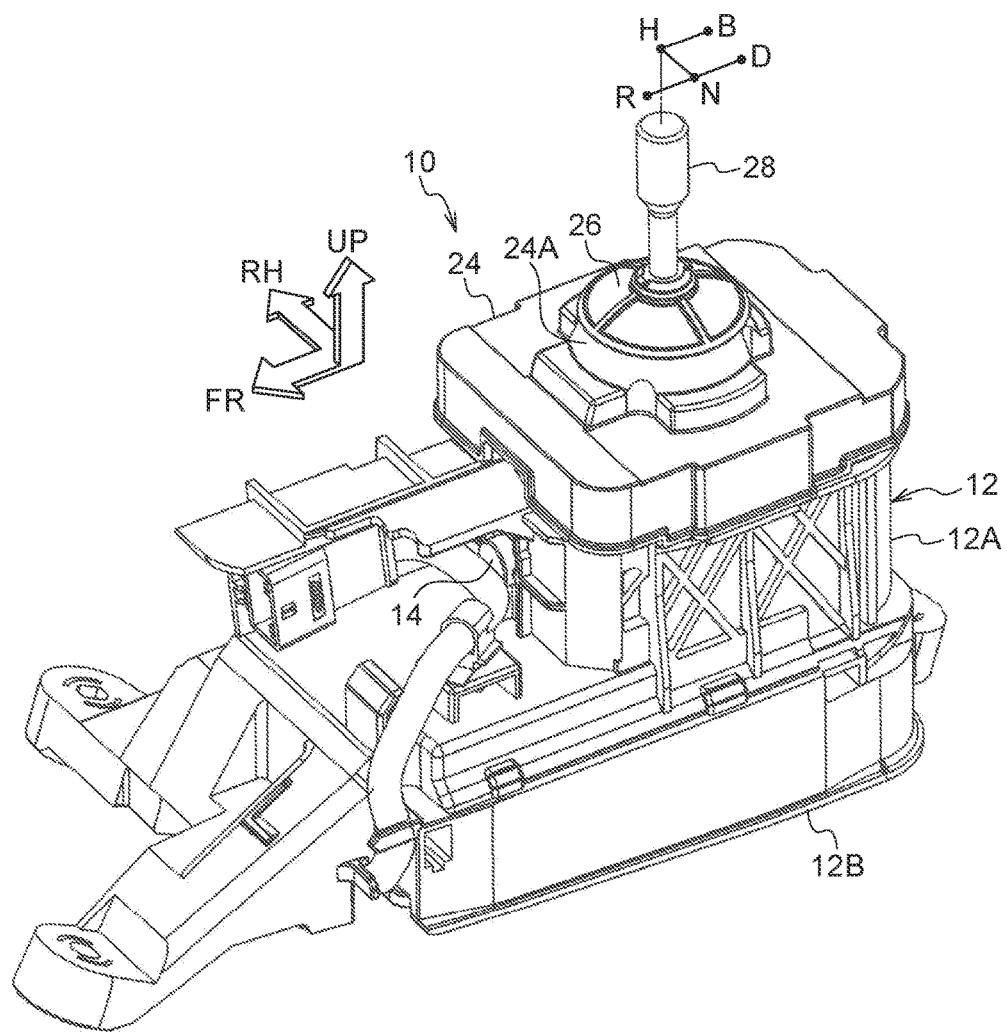
FIG. 1 is a perspective view illustrating a shift lever device according to an exemplary embodiment, as viewed from the oblique front left.
Figure 2:
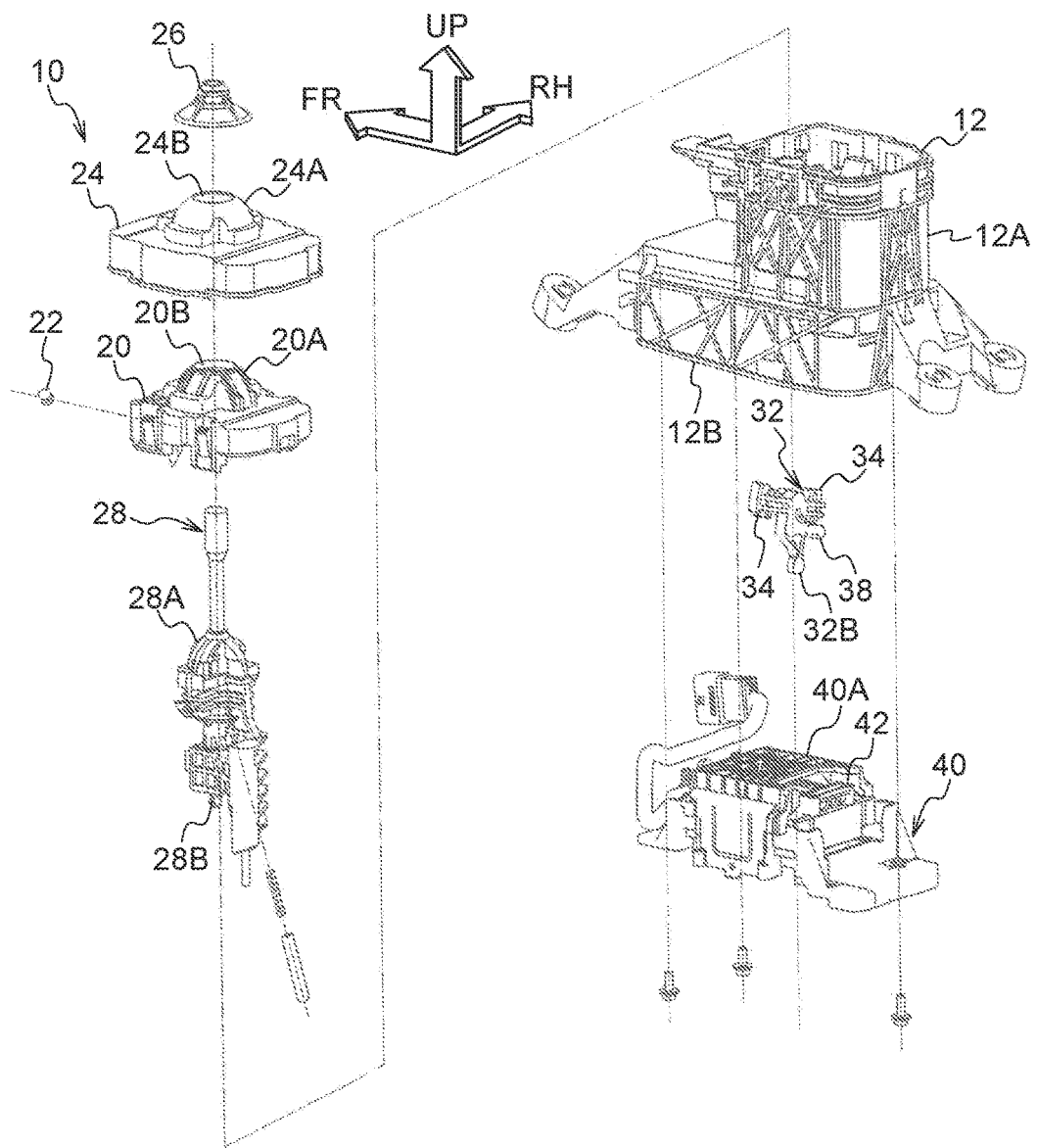
FIG. 2 is an exploded perspective view illustrating a shift lever device according to an exemplary embodiment, as viewed from the oblique rear left.

FIG. 1 is a perspective view illustrating a shift lever device 10, serving as a shift device according to an exemplary embodiment, as viewed from the oblique front left. FIG. 2 is an exploded perspective view illustrating the shift lever device 10 as viewed from the oblique rear left. Note that in the drawings, the arrow FR indicates a forward direction of the shift lever device 10, the arrow RH indicates a rightward direction of the shift lever device 10, and the arrow UP indicates an upward direction of the shift lever device 10.

The shift lever device 10 according to the present exemplary embodiment is a floor-mounted type installed to a vehicle width direction central portion of a floor section (vehicle body side) of a vehicle cabin of a vehicle (automobile). The forward direction, the leftward direction, and the upward direction of the shift lever device 10 are respectively oriented in a forward direction, leftward direction, and upward direction of the vehicle.

As illustrated in FIG. 1 and FIG. 2, the shift lever device 10 is provided with a plate 12 (housing) that is made from resin, that has a substantially tube shape, and that serves as an installation body. The plate 12 is installed (fixed) to the floor section of the vehicle cabin. A substantially rectangular tube shaped upper plate 12A, serving as a first installation portion, is provided at a rear side and upper side portion of the plate 12. The interior of the upper plate 12A is open toward the upper side. A lower plate 12B, that has a substantially rectangular tube shape and that serves as a second installation portion, is provided at a lower side portion of the plate 12. The interior of the lower plate 12B is open toward the lower side. A front side portion of the interior of the lower plate 12B is closed off at the upper side, and an upper side of a rear side portion of the interior of the lower plate 12B is in communication with the interior of the upper plate 12A.

A support tube 14 (see FIG. 6C) having a bottomed tube shape and serving as an assembly portion is formed at a central portion of a front wall of the upper plate 12A. An axial direction of the interior of the support tube 14 is disposed parallel with the front-rear direction, and the support tube 14 is open toward the rear. A reinforcement frame 14A with a cross-section profile substantially in the shape of an upturned U-shaped frame (see FIG. 6C) is formed at the upper side of the support tube 14 at the inside of the front wall of the upper plate 12A. A lower end of the reinforcement frame 14A is integrally formed to the support tube 14, and reinforces the support tube 14.

Elongated plate shaped guide plates 16 (see FIG. 6C), serving as guide portion, are integrally provided to a left wall and a right wall of the upper plate 12A, in the vicinity of a rear side of the front wall of the upper plate 12A. The guide plates 16 extend in an up-down direction and are disposed so as to be perpendicular to the front-rear direction. A leading end (right end) of a lower side portion of the left side guide plate 16, and a leading end (left end) of the entire right side guide plate 16 along the up-down direction, extend parallel to the up-down direction. A leading end (right end) of an upper side portion of the left side guide plate 16 extends in a circular arc shape that is coaxial to the interior of the support tube 14 so as to be curved with a concave profile in a direction heading toward the right on progression upward. A trapezoidal shaped pass-through cavity (hole) 18, serving as a pass-through portion, is formed penetrating a leading end side (right side) and a lower side corner portion of the left side guide plate 16. The pass-through cavity 18 is open toward the right side and the lower side.

Inside a corner portion at the front side and left side of the upper plate 12A, a stopping face 12C (see FIG. 6C) that has a flat plane profile and that serves as a stopping portion is formed directly above the left side guide plate 16. The stopping face 12C is disposed so as to perpendicular to the up-down direction, and is configured integrally to the left side guide plate 16.

A seat 20 that is made from resin, that has a bottomed, substantially rectangular tube shape, and that serves as a support body is assembled to an upper side of the upper plate 12A. The interior of the seat 20 is open toward the lower side, such that the seat 20 covers the interior of the upper plate 12A from the upper side. An upper wall (bottom wall) of the seat 20 is formed with a substantially hemispherical frame shaped support frame 20A, serving as a retention portion. The interior of the support frame 20A is in communication with the interior of the seat 20. A circular insertion hole 20B is formed penetrating an upper portion of the support frame 20A, and the insertion hole 20B opens the interior of the support frame 20A toward the upper side. Substantially circular column shaped stoppers 22, serving as restriction portion, are respectively fixed to a left portion and a right portion of an inner side of a front wall of the seat 20. The stoppers 22 are made from rubber, and have elastic properties.

A first boot 24 that is made from rubber, that has a bottomed, substantially rectangular tube shape, and that serves as a first covering body is assembled to the upper side of the seat 20. The interior of the first boot 24 is open toward the lower side, and covers the seat 20 from the upper side. An upper wall (bottom wall) of the first boot 24 is formed with a substantially hemispherical frame shaped covering frame 24A, serving as a covering portion. The interior of the covering frame 24A is in communication with the interior of the first boot 24, and the covering frame 24A covers the support frame 20A of the seat 20 from the upper side. A circular communication hole 24B is formed penetrating an upper portion of the covering frame 24A. The communication hole 24B opens the interior of the covering frame 24A toward the upper side, and is in communication with the insertion hole 20B of the support frame 20A.

A second boot 26 that is made from rubber, that has a substantially conical tube shape, and that serves as a second covering body, is provided at an upper side of the first boot 24. The second boot 26 covers the communication hole 24B in the covering frame 24A of the first boot 24 from the upper side.

An elongated column shaped lever 28 that is made from a resin and that serves as a shift body is inserted through a rear side portion of the interior of the plate 12. An up-down direction (length direction, axial direction) intermediate portion of the lever 28 is provided with a substantially spherical support ball 28A, serving as a support portion. A peripheral face of the support ball 28A is configured with a substantially spherical face shape, and the support ball 28A is rotatably retained (supported) inside the support frame 20A of the seat 20. The lever 28 is thereby capable of rotating within a predetermined range in the front-rear direction (shift direction, first direction) and the left-right direction (select direction, second direction), centered on the support ball 28A.

An upper side portion (one end side portion) of the lever 28 is inserted through the insertion hole 20B in the seat 20 (the support frame 20A), the communication hole 24B of the first boot 24 (the covering frame 24A), and the interior of the second boot 26. The lever 28 is capable of rotating with respect to the insertion hole 20B and the communication hole 24B, and is capable of rotating integrally (as a unit) together with the second boot 26. The lever 28 extends out to the upper side of the second boot 26, and an upper end portion of the lever 28 can be rotationally operated by a vehicle occupant (for example the driver).

The lever 28 is disposed at an "H" position (home position), serving as a shift position. Rotation operating the lever 28 from the "H" position toward the rear side disposes the lever 28 at a "B" position (brake position), serving as a shift position. Rotation operating the lever 28 from the "H" position toward the left side (or toward the right side) disposes the lever 28 at an "N" position (neutral position), serving as a shift position. Moreover, rotation operating the lever 28 from the "N" position toward the front side disposes the lever 28 at an "R" position (reverse position), serving as a shift position, and rotation operating the lever 28 from the "N" position toward the rear side disposes the lever 28 at a "D" position (drive position), serving as a shift position.

An urging force acts on the lever 28 such that under the urging force, the lever 28 is disposed at the "H" position described above. When rotation operation force ceases to act on the lever 28 following a state in which the lever 28 has been rotation operated against the urging force to a shift position other than the "H" position, the lever 28 is rotated and returned to the "H" position by the urging force.

Figure 3:
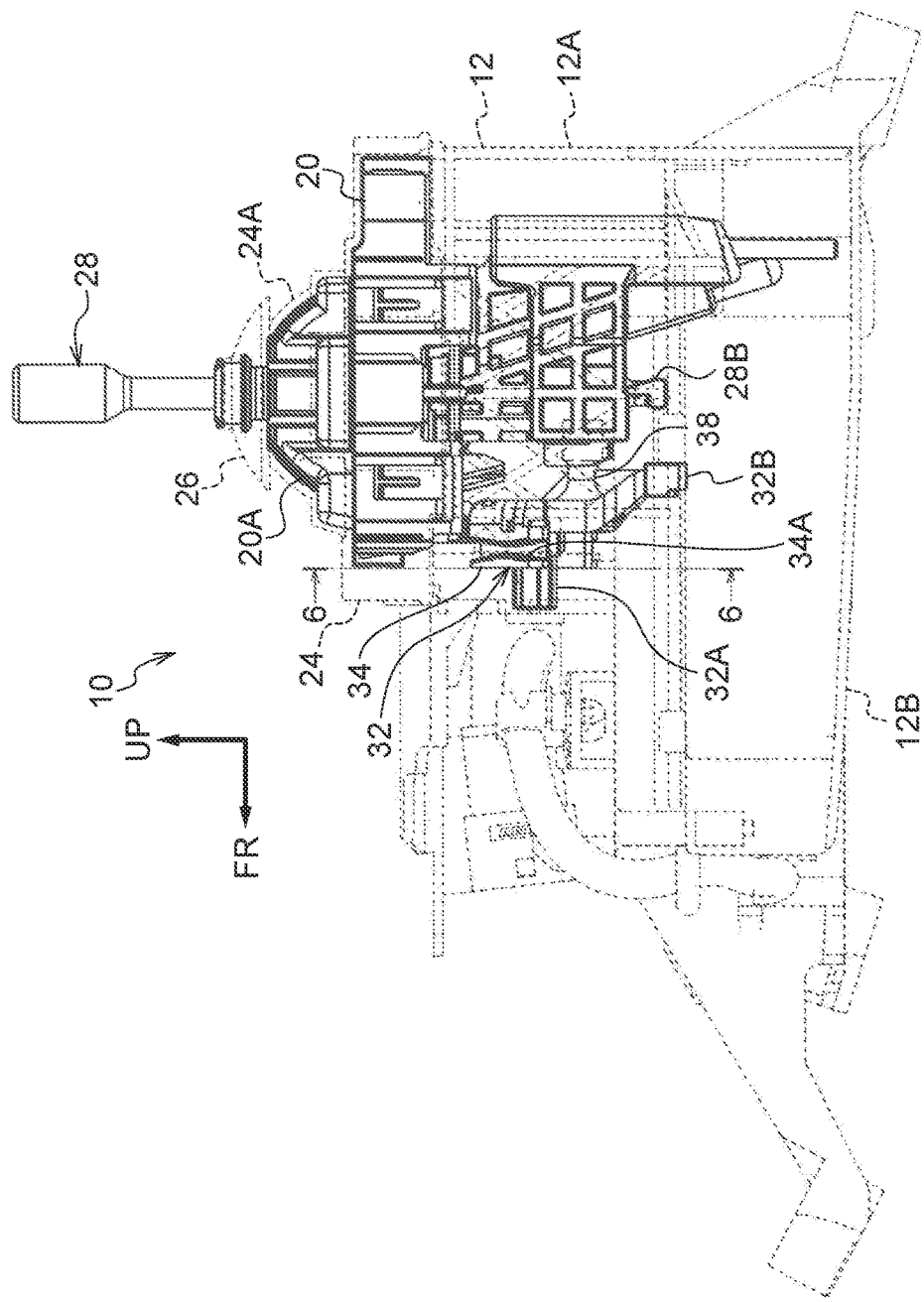
FIG. 3 is a side view illustrating a shift lever device according to an exemplary embodiment, as viewed from the left.
Figure 4:
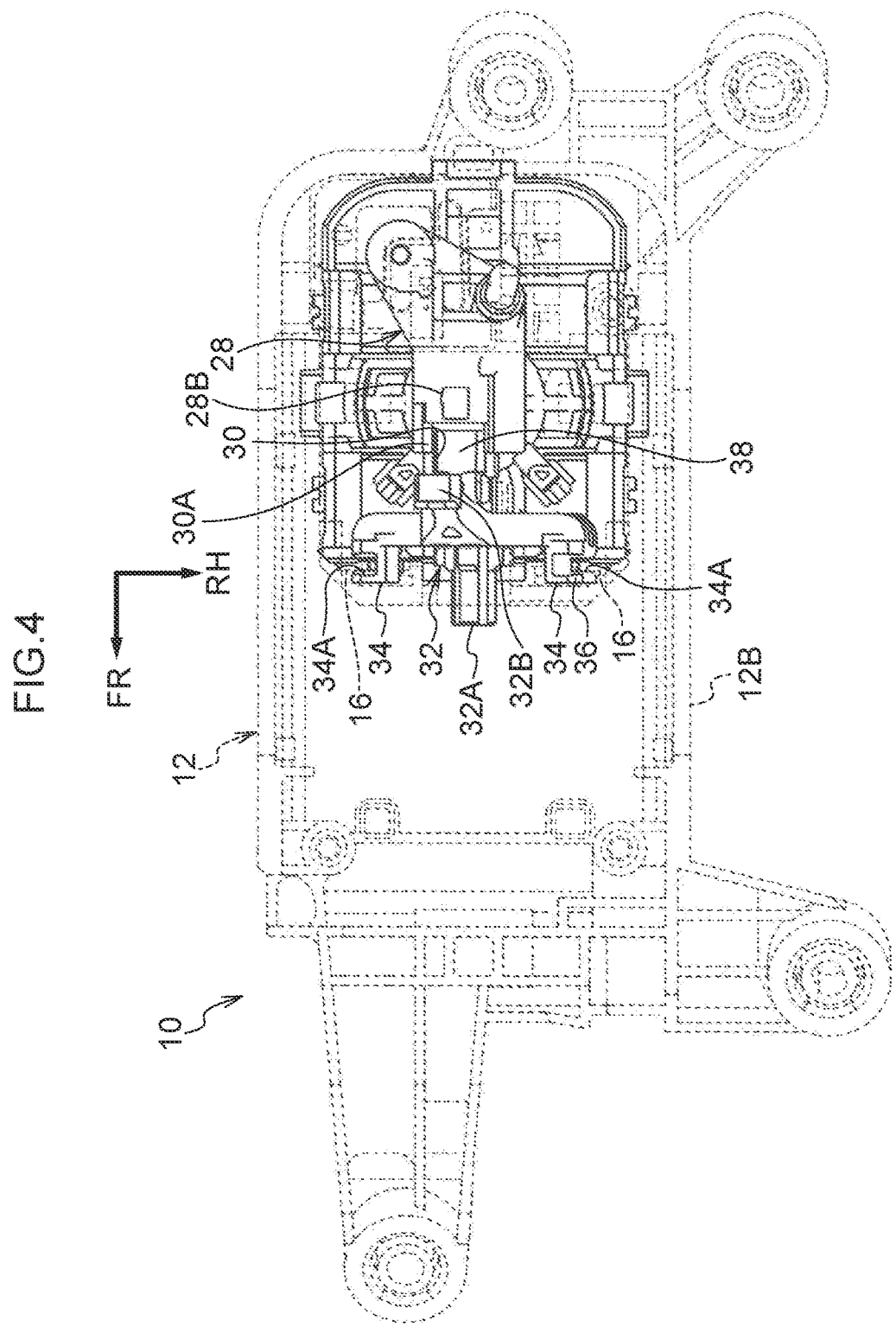
FIG. 4 is a lower face view of a shift lever device according to an exemplary embodiment, as viewed from below.
Figure 5:
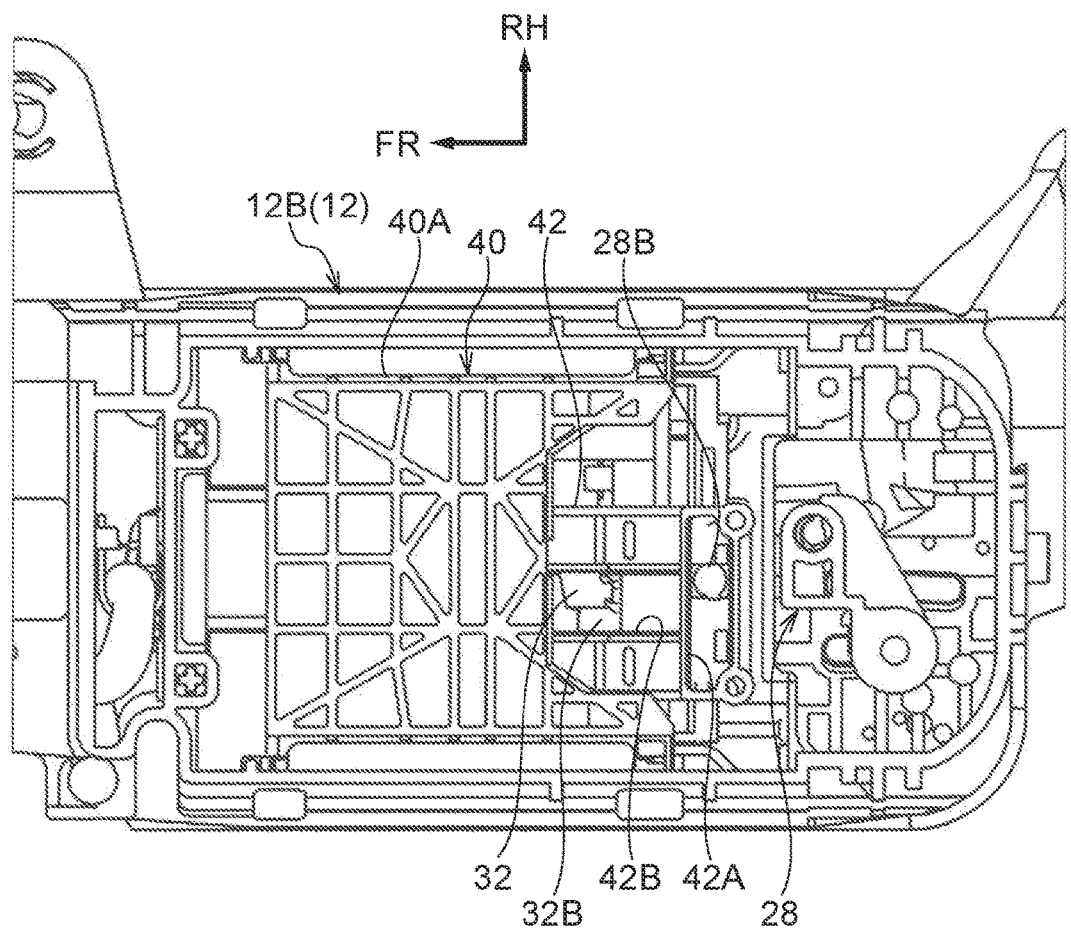
FIG. 5 is a cross-section illustrating elements including a sensor unit of a shift lever device according to an exemplary embodiment, as viewed from above.

A lower side portion (another end side portion) of the lever 28 is integrally provided with a first joint portion 28B (see FIG. 3 to FIG. 5), serving as a first communicating (connecting) portion. The first joint portion 28B projects out toward the lower side, and a front face and rear face of a lower portion of the first joint portion 28B are curved so as to have convex profiles with respect to the up-down direction (line).

A front end portion of the lower side portion of the lever 28 is formed with a rectangular column shaped communicating (connecting) hole (cavity) 30 (see FIG. 4 and FIG. 6C) that serves as a rotation section. The communicating hole 30 is open at a front side and at a lower side. When the lever 28 is disposed at the "H" position as described above, a left face and a right face of the communicating hole 30, serving as rotation portion and configured with flat plane profiles, are disposed parallel to the front-rear direction, and are inclined in a direction toward the right on progression upward.

In a rotation operation of the lever 28 toward the left side or the right side between the "H" position and the "N" position, the communicating hole 30 is rotated toward the right side or the left side respectively, in a state in which the left face and the right face of the communicating hole 30 are disposed parallel with the front-rear direction. Moreover, in a rotation operation of the lever 28 to the center between the "H" position and the "N" position, the left face and the right face of the communicating hole 30 are disposed perpendicular to the left-right direction. When the lever 28 has been rotation operated to the "N" position, the left face and the right face of the communicating hole 30 are inclined in a direction toward the left on progression upward. Moreover, in a rotation operation of the lever 28 toward the front side, the communicating hole 30 is rotated toward the rear side while an upper portion of the communicating hole 30 tilts further toward the front side than a lower portion of the communicating hole 30, and in a rotation operation of the lever 28 toward the rear side, the communicating hole 30 is rotated toward the front side while the upper portion of the communicating hole 30 tilts further toward the rear side than the lower portion of the communicating hole 30.

A corner portion at a left side and lower side of the communicating hole 30 is formed with a chamfer portion 30A that has a flat plane profile and that serves as an insertion portion. The chamfer portion 30A is inclined in a direction toward the left on progression downward such that a left-right direction dimension of a lower side opening portion of the communicating hole 30 gradually increases in size on progression toward the lower side.

A select link 32 (see FIG. 3 to FIG. 5 and FIG. 6C) that is made from resin, and that serves as a moving body, is disposed at a front side of the lower side portion of the lever 28. The select link 32 has a T-shaped profile as viewed face-on (as viewed along the front-rear direction). A substantially circular column shaped rotation shaft 32A is integrally provided at a left-right direction center of an upper portion of the select link 32. The rotation shaft 32A projects out toward the front. The rotation shaft 32A is fitted coaxially inside the support tube 14 in the front wall of the upper plate 12A of the plate 12. The select link 32 is capable of rotating about the front-rear direction, centered on the rotation shaft 32A. A left side portion of the select link 32 is capable of elastically abutting the left side stopper 22 of the seat 20 when rotated toward the upper side, and a right side portion of the select link 32 is capable of elastically abutting the right side stopper 22 of the seat 20 when rotated toward the upper side, thereby defining a rotation range of the select link 32.

A left end portion and a right end portion of the select link 32 are each formed with a substantially rectangular parallelopiped (rectangular block) shaped guide 34, serving as guided portion. The guides 34 each project out toward the front side, the upper side, and the lower side. Each guide 34 is formed with a guide groove 34A having a rectangular cross-section profile. The guide groove 34A extends in the up-down direction and is open at an upper side and a lower side, and is open toward a rotation radial direction outside of the select link 32 (the left side of the left side guide 34 and the right side of the right side guide 34). The left side and right side guide plates 16 of the upper plate 12A of the plate 12 are respectively inserted into the guide grooves 34A of the left side and right side guides 34 so as to be fitted together therewith in the front-rear direction. Due to the guide grooves 34A being rotated in the up-down direction along the guide plates 16, rotation of the select link 32 is guided by the guide plates 16, such that the guide plates 16 restrict the select link 32 from swinging about the rotation radial direction.

A corner portion at left side and upper side and a corner portion at right side and lower side of the right side guide 34 are each formed with a pass-through face 36 that has a flat plane profile and that serves as a pass-through portion. The pair of pass-through faces 36 are each disposed parallel with the front-rear direction, and are also disposed parallel to one another.

A communication (connection) projection 38 having a substantially circular column shape and serving as a moving portion (rotated portion) is integrally provided at an upper portion (at the lower side of the rotation shaft 32A) of a lower side portion of the select link 32. The communication projection 38 projects out toward the rear. A left face and a right face of a rear portion (leading end side portion) of the communication projection 38 are formed with circular arc shaped cross-section profiles lying on the same circle, and are curved with a convex profile with respect to the up-down direction. A rear portion of the communication projection 38 is inserted into the communicating hole 30 of the lever 28.

The rear portion of the communication projection 38 is fitted between the left face and the right face of the communicating hole 30 in the left-right direction. In a rotation operation of the lever 28 toward the left side or the right side between the "H" position and the "N" position, the communication projection 38 is rotated toward the right side or the left side respectively, together with the communicating hole 30, such that the lower side portion of the select link 32 is rotated toward the right side or the left side. Moreover, in a rotation operation of the lever 28 toward the front side or the rear side, the communicating hole 30 is rotated toward the rear side or the front side respectively with respect to the communication projection 38.

As described above, when the lever 28 is disposed at the "H" position, the left face and the right face of the communicating hole 30 are inclined in a direction toward the right on progression upward. Accordingly, in a rotation operation of the lever 28 toward the rear side between the "H" position and the "B" position, the communicating hole 30 is rotated toward the front side while the upper portion of the communicating hole 30 tilts toward the rear side with respect to the lower portion of the communicating hole 30, the left face of the communicating hole 30 is rotated toward a side away (apart) from the rear portion of the communication projection 38 in the left-right direction while tilting toward a side approaching the rear portion of the communication projection 38 in the left-right direction, and the right face of the communicating hole 30 is rotated toward the side approaching the rear portion of the communication projection 38 in the left-right direction while tilting toward the side away (apart) from the rear portion of the communication projection 38 in the left-right direction. On the other hand, in a rotation operation of the lever 28 toward the front side between the "H" position and the "B" position, the communicating hole 30 is rotated toward the rear side while the upper portion of the communicating hole 30 tilts toward the front side with respect to the lower portion of the communicating hole 30, the left face of the communicating hole 30 is rotated toward the side approaching the rear portion of the communication projection 38 in the left-right direction while tilting toward the side away from the rear portion of the communication projection 38 in the left-right direction, and the right face of the communicating hole 30 is rotated toward the side away from the rear portion of the communication projection 38 in the left-right direction while tilting toward the side approaching the rear portion of the communication projection 38 in the left-right direction.

As described above, when the lever 28 has been rotation operated to the "N" position, the left face and the right face of the communicating hole 30 are inclined in a direction toward the left on progression upward. Accordingly, in a rotation operation of the lever 28 toward the rear side between the "R" position and the "D" position, the communicating hole 30 is rotated toward the front side while the upper portion of the communicating hole 30 tilts toward the rear side with respect to the lower portion of the communicating hole 30, the left face of the communicating hole 30 is rotated toward the side approaching the rear portion of the communication projection 38 in the left-right direction while tilting toward the side away from the rear portion of the communication projection 38 in the left-right direction, and the right face of the communicating hole 30 is rotated toward the side away from the rear portion of the communication projection 38 in the left-right direction while tilting toward the side approaching the rear portion of the communication projection 38 in the left-right direction. On the other hand, in a rotation operation of the lever 28 toward the front side between the "R" position and the "D" position, the communicating hole 30 is rotated toward the rear side while the upper portion of the communicating hole 30 tilts toward the front side with respect to the lower portion of the communicating hole 30, the left face of the communicating hole 30 is rotated toward the side away from the rear portion of the communication projection 38 in the left-right direction while tilting toward the side approaching the rear portion of the communication projection 38 in the left-right direction, and the right face of the communicating hole 30 is rotated toward the side approaching the rear portion of the communication projection 38 in the left-right direction while tilting toward the side away from the rear portion of the communication projection 38 in the left-right direction.

Accordingly, rotation operation in a front-rear direction of the lever 28, the left face and the right face of the communicating hole 30 are suppressed (more specifically, prevented) from rotating in the left-right direction, and the rear portion of the communication projection 38 is suppressed (more specifically, prevented) from rotating in the left-right direction. Accordingly, the lower side portion of the select link 32 is suppressed (more specifically, prevented) from rotating in the left-right direction.

A lower end portion of the select link 32 is formed with a second joint portion 32B serving as a second communicating (connecting) portion. A left face and a right face of the second joint portion 32B are curved so as to have convex profiles with respect to the up-down direction.

A sensor unit 40 (see FIG. 5), serving as a detection section, is fixed inside the lower plate 12B of the plate 12. With the exception of at a rear portion of the sensor unit 40, the sensor unit 40 is provided with a substantially rectangular block shaped sensor mechanism 40A, serving as a detection mechanism.

An upper end portion of the sensor mechanism 40A is provided with an operation member 42 that serves as a communicated (connected) member and that has a rectangular shape in plan view. An upper wall of the sensor mechanism 40A is disposed at the upper side of a front side portion of the operation member 42, and a rear side portion of the operation member 42 is open toward the upper side.

A first operation groove (slot) 42A that has a rectangular cross-section profile and that serves as a first connected (communicated) portion is formed at a rear end portion of the operation member 42. The first operation groove 42A extends in the left-right direction. The first operation groove 42A is open toward the upper side, and the lower portion of the first joint portion 28B of the lever 28 is inserted into (communicated with (connected to)) the first operation groove 42A so as to be fitted thereto (stopped thereat) in the front-rear direction. In a rotation operation of the lever 28 toward the front side or the rear side, the lower portion of the first joint portion 28B is rotated toward the rear side or the front side respectively, such that the operation member 42 respectively moves (slides) toward the rear side or the front side. In a rotation operation of the lever 28 in the left-right direction, the first operation groove 42A is permitted to move in the left-right direction with respect to the lower portion of the first joint portion 28B, thereby permitting movement (sliding) of the operation member 42 in the left-right direction.

A second operation groove (slot) 42B that has a rectangular cross-section profile and that serves as a second connected (communicated) portion is formed at a rear side portion of the operation member 42, at the front side of a left-right direction central portion of the first operation groove 42A. The second operation groove 42B extends in the front-rear direction. The second operation groove 42B is open toward the upper side, and the second joint portion 32B of the select link 32 is inserted into (communicated with (connected to)) the second operation groove 42B so as to be fitted thereto (stopped thereat) in the left-right direction. In a rotation operation of the lever 28 toward the left side or the right side, the second joint portion 40B is rotated toward the right side or the left side respectively, such that the operation member 42 moves (slides) toward the right side or the left side. In a rotation operation of the lever 28 in the front-rear direction, the second operation groove 42B is permitted to move in the front-rear direction with respect to the second joint portion 40B, thereby permitting movement (sliding) of the operation member 42 in the front-rear direction.

A magnet (not illustrated in the drawings), serving as a detected portion, is fixed to a front side portion of the operation member 42. The magnet moves in the front-rear direction and the left-right direction together integrally (as a unit) with the operation member 42, and the magnet generates magnetic force.

A sensor substrate (not illustrated in the drawings), serving as a detection portion, is fixed inside the sensor mechanism 40A at a lower side of the magnet. The sensor substrate faces the magnet of the operation member 42. The sensor substrate is capable of detecting the magnetic force generated by the magnet, thus detecting the position of the magnet in the front-rear direction and the left-right direction, and thereby detecting the position of the operation member 42 in the front-rear direction and the left-right direction.

Next, explanation follows regarding operation of the present exemplary embodiment.

In the shift lever device 10 configured as described above, the sensor unit 40 is disposed at the lower side of the lever 28 and the select link 32, and the first joint portion 28B of the lever 28 and the second joint portion 32B of the select link 32 are respectively communicated (connected) to the first operation slot 42A and the second operation slot 42B of the operation member 42 of the sensor mechanism 40A of the sensor unit 40. In a rotation operation of the lever 28 in the front-rear direction, the first joint portion 28B of the lever 28 is rotated in the front-rear direction such that the operation member 42 moves in the front-rear direction. On the other hand, in a rotation operation of the lever 28 in the left-right direction, the communicating hole 30 of the lever 28 and the communication projection 38 of the select link 32 are rotated in the left-right direction, thereby rotating the second joint portion 32B of the select link 32 in the left-right direction, and moving the operation member 42 in the left-right direction. Moreover, the position of the magnet of the operation member 42 in the front-rear direction and the left-right direction is detected by the sensor substrate of the sensor mechanism 40A so as to detect the position of the operation member 42 in the front-rear direction and the left-right direction, and thereby detect the shift position of the lever 28.

Note that as described above, in a rotation operation of the lever 28 in the front-rear direction, the first joint portion 28B of the lever 28 moves the operation member 42 in the front-rear direction. Accordingly, the lever 28 moves the operation member 42 in the front-rear direction without being through the select link 32 (directly, rather than through the select link 32), thereby enabling the precision of the movement position of the operation member 42 in the front-rear direction to be raised in a rotation operation of the lever 28 in the front-rear direction, and enabling the precision with which the shift position of the lever 28 in the front-rear direction is detected by the sensor mechanism 40A to be raised.

Moreover, the second joint portion 32B of the select link 32 is disposed further to a rotation radial direction outside of the select link 32 than the communicating hole 30 of the lever 28 (the connecting projection 38 of the select link 32). Accordingly, in a rotation operation of the lever 28 in the left-right direction, a rotation stroke of the second joint portion 32B of the select link 32 is amplified with respect to a left-right direction rotation stroke of the communicating hole 30 of the lever 28 (connecting projection 38 of the select link 32), thereby increasing a left-right direction movement stroke of the operation member 42. This thereby enables a large movement stroke of the operation member 42 due to the lever 28 being rotationally operated between shift positions in the left-right direction, even if the rotation angle and rotation stroke of the lever 28 between shift positions in the left-right direction is small. The precision with which the shift position of the lever 28 in the left-right direction is detected by the sensor mechanism 40A can accordingly be raised.

Moreover, when the lever 28 is rotated in the front-rear direction, the communicating hole 30 is rotated in the front-rear direction, such that the left face and the right face of the communicating hole 30 are rotated toward the side approaching the rear portion of the connecting projection 38 in the left-right direction while tilting toward the side away from the rear portion of the communication projection 38 in the left-right direction, or, are rotated toward the side away from the rear portion of the communication projection 38 in the left-right direction while tilting toward the side approaching the rear portion of the communication projection 38 in the left-right direction. Accordingly, the left face and the right face of the communicating hole 30 are suppressed from rotating in the left-right direction and the rear portion of the communication projection 38 is suppressed from rotating in the left-right direction, thereby suppressing the second joint portion 32B of the select link 32 from rotating in the left-right direction. This thereby enables the operation member 42 to be suppressed from moving in the left-right direction, and enables the precision with which the shift position of the lever 28 is detected by the sensor mechanism 40A to be raised.

Moreover, when the select link 32 is rotated in a left-right direction rotation operation of the lever 28, the guide grooves 34A of the guides 34 of the select link 32 are rotated in the up-down direction along the guide plates 16 of the upper plate 12A of the plate 12, such that the rotation of the select link 32 is guided by the guide plates 16, and the select link 32 is restricted from swinging about the rotation radial direction by the guide plates 16. This thereby enables the precision of the rotation position of the second joint portion 32B of the select link 32 in the left-right direction to be raised due to a left-right direction rotation operation of the lever 28, thus enabling the precision with which the shift position of the lever 28 in the left-right direction is detected by the sensor mechanism 40A to be raised.

Moreover, during assembly of the select link 32 and the lever 28 to the plate 12, the rotation shaft 32A of the select link 32 is fitted inside the support tube 14 of the upper plate 12A of the plate 12 from the front side, after which, the lever 28 is inserted into the upper plate 12A from the upper side and the rear portion of the communication projection 38 of the select link 32 is inserted into the communicating hole 30 of the lever 28.

Figure 6A:
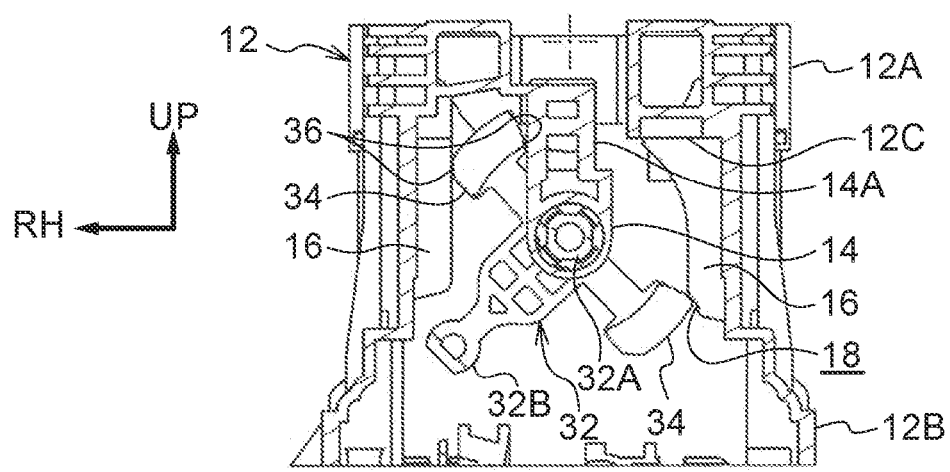

Note that as illustrated in FIG. 6A, when fitting the rotation shaft 32A of the select link 32 inside the support tube 14 of the upper plate 12A from the front side, in a state in which the select link 32 is arranged at a rotation position outside the rotation range by the lever 28 in a left-right direction rotating operation, the left side guide 34 of the select link 32 is passed through to the front side of the pass-through cavity (hole) 18 in the left side guide plate 16 of the upper plate 12A, and the right side and left side pass-through faces 36 of the right side guide 34 of the select link 32 are respectively passed through to the front side of the right side guide plate 16 of the upper plate 12A and the reinforcement frame 14A. Accordingly, the select link 32 is capable of passing through to the front side of the pair of guide plates 16 and the reinforcement frame 14A, enabling the rotation shaft 32A to be fitted inside the support tube 14, after which, the guide plate 16 can be inserted into the guide grooves 34A of the guides 34 by rotating the select link 32. Moreover, when the select link 32 is disposed within the rotation range thereof due to the lever 28 in a left-right direction rotation operation, the guide plates 16 are inserted in the guide grooves 34A of the guides 34 at all times, thereby enabling the select link 32 to be restricted from moving in the front-rear direction by the guide plates 16, enabling the rotation shaft 32A to be restricted from coming out from the support tube 14, and thus enabling the select link 32 to be restricted from coming out from the upper plate 12A.

Figure 6B:
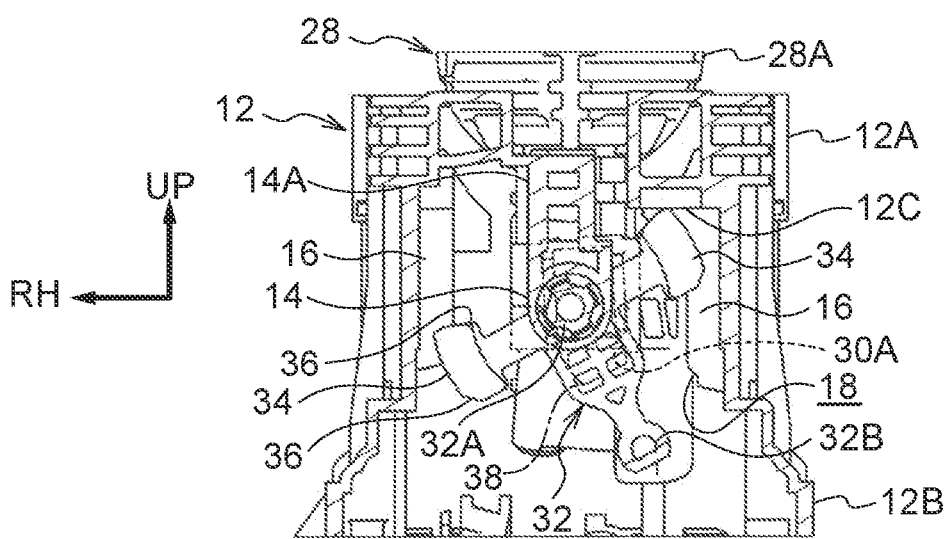

Moreover, as illustrated in FIG. 6B, when inserting of the lever 28 into the upper plate 12A from the upper side, the left side guide 34 of the select link 32 is abutted against the stopping face 12C of the upper plate 12A, thereby stopping the select link 32 at a temporary positioning position (stop position). Accordingly, when inserting of the rear portion of the communication projection 38 of the select link 32 into the communicating hole 30 of the lever 28, the chamfer portion 30A on the lower end left side of the communicating hole 30 is abutted against the left face of the rear portion of the communication projection 38. Thus, the rear portion of the communication projection 38 can be easily inserted into (communicated with) the communicating hole 30 due to the chamfer portion 30A guiding insertion of the rear portion of the communication projection 38 into the communicating hole 30, and moreover, the select link 32 can be easily arranged within the rotation range due to the lever 28 in a left-right direction rotation operation due to the chamfer portion 30A rotating the rear portion of the connecting projection 38 toward the right side.

Note that in the present exemplary embodiment, the communicating hole 30 is provided to the lever 28, and the communication projection 38 is provided to the select link 32. However, the communication projection 38 may be provided to the lever 28, with the communicating hole 30 being provided to the select link 32. In such a case, for example, a left face and a right face of the communication projection 38 of the lever 28 are each configured with a flat plane profile, and a left face and a right face of the communicating hole 30 of the select link 32 are curved so as to have a convex profile with respect to the up-down direction.

Moreover, in the present exemplary embodiment, the lever 28 moves the operation member 42 when the lever 28 is rotated in the front-rear direction, and the lever 28 rotates the select link 32 such that the select link 32 moves the operation member 42 when the lever 28 is rotation operated in the left-right direction. However, configuration may be made such that the lever 28 rotates the select link 32 such that the select link 32 moves the operation member 42 when the lever 28 is rotated in the front-rear direction, and such that the lever 28 moves the operation member 42 when the lever 28 is rotation operated in the left-right direction.

Moreover, in the present exemplary embodiment, the shift lever device 10 is a floor-mounted type installed to the floor section of the vehicle cabin. However, the shift lever device 10 may be installed to an instrument panel or a steering column of the vehicle cabin.

What is claimed is:

1. A shift device, comprising:
   a shift body having one end side that is movably operable in a first direction and in a second direction, a shift position of the shift body being changed by the shift body being moved at least one of in the first direction and in the second direction;
   a moving body that is movable by the shift body being moved in the second direction; and
   a single detection section that is disposed at another end side of the shift body, that is actuated by the shift body when the shift body is moved in the first direction such that the shift position of the shift body is detected, and that is actuated by the moving body when the shift body is moved in the second direction such that the shift position of the shift body is detected, wherein a first communicating portion and the shift body are monolithic, and a second communicating portion and the moving body are monolithic, the first communicating portion is communicated with the single detection section, and the second communicating portion is communicated with the single detection section, a rotating portion and the shift body are monolithic, a moving portion and the moving body are monolithic, the moving portion being communicated with the rotating portion, when the shift body is moved in the first direction, the first communicating portion is moved in the first direction, and the single detection section is actuated by the first communicating portion such that the shift position of the shift body in the first direction is detected, and when the shift body is moved in the second direction, the second communicating portion is moved in the second direction by the moving portion communicated with the rotating portion of the shift body being moved in the second direction, and the single detection section is actuated by the second communicating portion such that the shift position of the shift body in the second direction is detected.

2. The shift device of claim 1, wherein:

the moving body is rotated in the second direction via the moving portion and the rotation portion due to the shift body being rotated in the second direction, wherein a movement amount of a communicated portion of the second communicating portion of the moving body in the second direction is amplified with respect to a movement amount of the rotation portion of the shift body in the second direction due to the communicated portion of the second communicating portion of the moving body being disposed farther toward an outside in a radial direction of rotation of the moving body than the moving portion of the moving body, the communicated portion being communicated with the single detection section, and the moving portion of the moving body being communicated with the rotation portion of the shift body.

3. The shift device of claim 2, further comprising a guide portion that guides movement of the moving body.

4. The shift device of claim 2, wherein:

the first communicating portion and the second communicating portion are communicated with an operation member movable in the first and second directions provided at the detection section;

when the shift body is moved in the first direction, the first communicating portion moves the operation member, the shift position of the shift body in the first direction is detected by the detecting section detecting position of the operation member; and when the shift body is moved in the second direction, the second communicating portion moves the operation member, the shift position of the shift body in the second direction is detected by the detecting section detecting position of the operation member.

5. The shift device of claim 4, wherein:

the first communicating portion is fitted to the operation member in the first direction such that the operation member is moved in the first direction by the first communicating portion being moved in the first direction, and the second communicating portion is fitted to the operation member in the second direction such that the operation member is moved in the second direction by the second communicating portion being moved in the second direction.

6. The shift device of claim 1, further comprising a guide portion that guides movement of the moving body.

7. The shift device of claim 6, further comprising a stopping portion which is provided at one side of the guide portion, wherein the moving body is stopped at a stop position by abutting the stopping portion such that the shift body is able to communicate with the moving body from a state in which the moving body is stopped at the stop position.

8. The shift device of claim 1, wherein, the first communicating portion and the second communicating portion are communicated with an operation member movable in the first and second directions provided at the single detection section;

when the shift body is moved in the first direction, the first communicating portion moves the operation member, the shift position of the shift body in the first direction is detected by the single detecting section detecting position of the operation member; and when the shift body is moved in the second direction, the second communicating portion moves the operation member, the shift position of the shift body in the second direction is detected by the single detecting section detecting position of the operation member.

9. The shift device of claim 8, wherein one of the rotation portion and the moving portion is structured to be open at a side in the first direction, and the other of the rotation portion and the moving portion is structured to protrude in the first direction, and due to a protruding portion of the other of the rotation portion and the moving portion being inserted to an open portion of the one of the rotation portion and the moving portion in the first direction, when the shift body is moved in the first direction, the shift lever is moved with respect to the moving body in the first direction, and when the shift body is moved in the second direction, the protruding portion is moved in the second direction together with the open portion.

10. The shift device of claim 8, wherein:

the first communicating portion is fitted to the operation member in the first direction such that the operation member is moved in the first direction by the first communicating portion being moved in the first direction, and the second communicating portion is fitted to the operation member in the second direction such that the operation member is moved in the second direction by the second communicating portion being moved in the second direction.

11. The shift device of claim 10, wherein:

one of the rotation portion or the moving portion is structured to be open at a side in the first direction, and the other of the rotation portion or the moving portion is structured to protrude in the first direction, and due to a protruding portion of the other of the rotation portion or the moving portion being inserted to an open portion of the one of the rotation portion or the moving portion in the first direction, when the shift body is moved in the first direction, the shift lever is moved with respect to the moving body in the first direction, and when the shift body is moved in the second direction, the protruding portion is moved in the second direction together with the open portion.

12. The shift device of claim 1, wherein the first direction is transverse to the second direction.

* * * * *